United States Patent
Arroyo-Figueroa

(12) 
(10) Patent No.: US 7,120,569 B2
(45) Date of Patent: Oct. 10, 2006

(54) SEQUENTIAL MACHINE FOR SOLVING BOOLEAN SATISFIABILITY (SAT) PROBLEMS IN LINEAR TIME

(76) Inventor: Javier Armando Arroyo-Figueroa, P. O. Box 6688, Mayagüez, PR (US) 00681

(*) Notice: Subject to any disclaimer, the term of this patent is extended or adjusted under 35 U.S.C. 154(b) by 102 days.

(21) Appl. No.: 10/440,891

(22) Filed: May 19, 2003

(65) Prior Publication Data

US 2004/0236545 A1  Nov. 25, 2004

(51) Int. Cl.
*G06F 17/50* (2006.01)
*G06F 9/44* (2006.01)

(52) U.S. Cl. ............... 703/15; 703/17; 716/5; 716/7; 716/18

(58) Field of Classification Search ............ 703/2, 703/13, 15, 17; 714/738; 718/105; 716/3, 716/5, 7, 18
See application file for complete search history.

(56) References Cited

U.S. PATENT DOCUMENTS 5,276,897 A * 1/1994 Stalmarck ............ 718/105
5,831,996 A * 11/1998 Abramovici et al. ........ 714/738
6,389,374 B1 * 5/2002 Jain et al. ............... 703/2
2004/0210860 A1 * 10/2004 Ganai et al. ............ 716/5

OTHER PUBLICATIONS

Abramovici, M. and Saab, D., "Satisfiability on Reconfigurable Hardware", in 7th International Workshop on Field Programmable Logic and Applications (1997).

Cook, S., "The complexity of theorem proving procedures", Proceedings of the 3rd Annual ACM Symposium on the Theory of Computation (1971) 151-158.

Zhong, P., Martonosi, M., Ashar, P., and Malik, S., .

* cited by examiner

*Primary Examiner*—Thai Phan

(57) ABSTRACT

The invention is a sequential machine for solving boolean satisfiability (SAT) problems for functions of n variables and m clauses in linear time with complexity O(m), independent of the number of variables in the function. With current hardware technology, a value of n=32 variables can be achieved. The machine can serve as a basic building block to develop faster SAT solvers.

4 Claims, 4 Drawing Sheets

Schematic diagram of GP-SAT

General-Purpose SAT Solver (GP-SAT)

NOTES:
1. All negated clauses are input before the rising edge in each clock cycle
2. $L_i = 0$ if the literal $L_i$ is in the clause and is non-negated
3. $L_i = 1$ if the literal $L_i$ is in the clause and is negated
4. $X_i = 1$ if the literal $L_i$ is not in the clause
5. All $Y_m$ for which the clause evaluates to 1 are set to 1

Figure 1. Schematic diagram of GP-SAT
General-Purpose SAT Solver (GP-SAT)
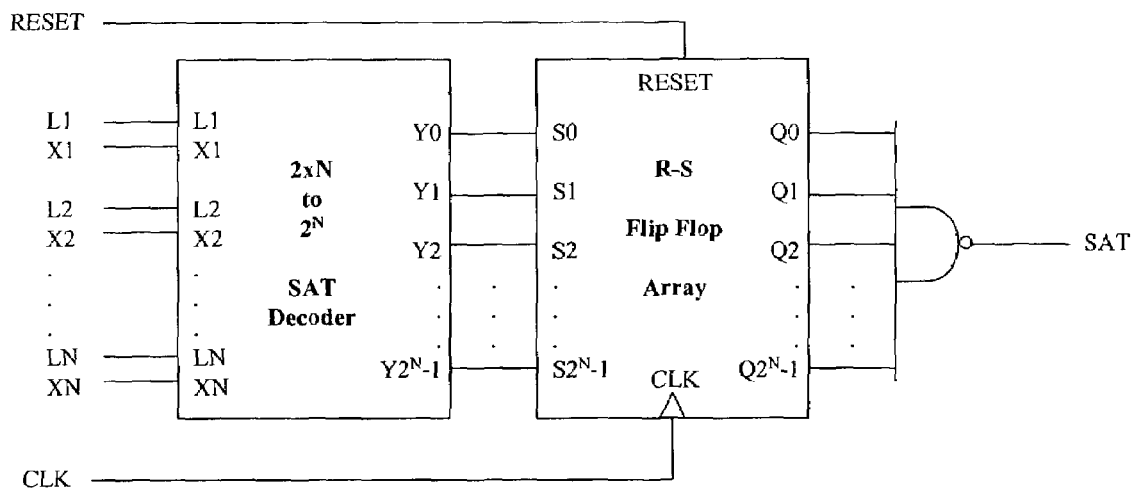
NOTES:
1. All negated clauses are input before the rising edge in each clock cycle
2. Li = 0 if the literal Li is in the clause and is non-negated
3. Li = 1 if the literal Li is in the clause and is negated
4. Xi = 1 if the literal Li is not in the clause
5. All Ym for which the clause evaluates to 1 are set to 1

Figure 2. Truth table for SAT Decoder

SAT Decoder Truth Table

| XN | XN-1 | ... | X3 | X2 | X1 | LN | LN-1 | ... | L3 | L2 | L1 | Y0 | Y1 | Y2 | Y3 | Y4 | Y5 | Y6 | Y7 | ... | YK-1 | YK |
|---|---|---|---|---|---|---|---|---|---|---|---|---|---|---|---|---|---|---|---|---|---|---|
| 0 | 0 | ... | 0 | 0 | 0 | 0 | 0 | ... | 0 | 0 | 0 | 1 | 0 | 0 | 0 | 0 | 0 | 0 | 0 | ... | 0 | 0 |
| 0 | 0 | ... | 0 | 0 | 0 | 0 | 0 | ... | 0 | 0 | 1 | 0 | 1 | 0 | 0 | 0 | 0 | 0 | 0 | ... | 0 | 0 |
| 0 | 0 | ... | 0 | 0 | 0 | 0 | 0 | ... | 0 | 1 | 0 | 0 | 0 | 1 | 0 | 0 | 0 | 0 | 0 | ... | 0 | 0 |
| 0 | 0 | ... | 0 | 0 | 0 | 0 | 0 | ... | 0 | 1 | 1 | 0 | 0 | 0 | 1 | 0 | 0 | 0 | 0 | ... | 0 | 0 |
| 0 | 0 | ... | 0 | 0 | 0 | 0 | 0 | ... | 1 | 0 | 0 | 0 | 0 | 0 | 0 | 1 | 0 | 0 | 0 | ... | 0 | 0 |
| 0 | 0 | ... | 0 | 0 | 0 | 0 | 0 | ... | 1 | 0 | 1 | 0 | 0 | 0 | 0 | 0 | 1 | 0 | 0 | ... | 0 | 0 |
| 0 | 0 | ... | 0 | 0 | 0 | 0 | 0 | ... | 1 | 1 | 0 | 0 | 0 | 0 | 0 | 0 | 0 | 1 | 0 | ... | 0 | 0 |
| 0 | 0 | ... | 0 | 0 | 0 | 0 | 0 | ... | 1 | 1 | 1 | 0 | 0 | 0 | 0 | 0 | 0 | 0 | 1 | ... | 0 | 0 |
| ... | ... | ... | ... | ... | ... | ... | ... | ... | ... | ... | ... | ... | ... | ... | ... | ... | ... | ... | ... | ... | ... | ... |
| 0 | 0 | ... | 0 | 0 | 0 | 1 | 1 | ... | 1 | 1 | 0 | 0 | 0 | 0 | 0 | 0 | 0 | 0 | 0 | ... | 1 | 0 |
| 0 | 0 | ... | 0 | 0 | 0 | 1 | 1 | ... | 1 | 1 | 1 | 0 | 0 | 0 | 0 | 0 | 0 | 0 | 0 | ... | 0 | 1 |
| ... | ... | ... | ... | ... | ... | ... | ... | ... | ... | ... | ... | ... | ... | ... | ... | ... | ... | ... | ... | ... | ... | ... |
| 0 | 0 | ... | 0 | 0 | 1 | 0 | 0 | ... | 0 | 0 | X | 1 | 1 | 0 | 0 | 0 | 0 | 0 | 0 | ... | 0 | 0 |
| 0 | 0 | ... | 0 | 1 | 0 | 0 | 0 | ... | 0 | X | 0 | 1 | 0 | 1 | 0 | 0 | 0 | 0 | 0 | ... | 0 | 0 |
| 0 | 0 | ... | 0 | 1 | 0 | 0 | 0 | ... | 0 | X | 1 | 1 | 0 | 0 | 1 | 0 | 0 | 0 | 0 | ... | 0 | 0 |
| 0 | 0 | ... | 0 | 1 | 1 | 0 | 0 | ... | 0 | X | X | 1 | 1 | 1 | 1 | 0 | 0 | 0 | 0 | ... | 0 | 0 |
| 0 | 0 | ... | 1 | 0 | 0 | 0 | 0 | ... | X | 0 | 0 | 1 | 0 | 0 | 0 | 1 | 0 | 0 | 0 | ... | 0 | 0 |
| 0 | 0 | ... | 1 | 0 | 0 | 0 | 0 | ... | X | 0 | 1 | 1 | 0 | 0 | 0 | 0 | 1 | 0 | 0 | ... | 0 | 0 |
| 0 | 0 | ... | 1 | 0 | 0 | 0 | 0 | ... | X | 1 | 0 | 0 | 0 | 1 | 0 | 0 | 0 | 1 | 0 | ... | 0 | 0 |
| 0 | 0 | ... | 1 | 0 | 0 | 0 | 0 | ... | X | 1 | 1 | 0 | 0 | 0 | 1 | 0 | 0 | 0 | 1 | ... | 0 | 0 |
| 0 | 0 | ... | 1 | 0 | 1 | 0 | 0 | ... | X | 0 | X | 1 | 1 | 0 | 0 | 1 | 1 | 0 | 0 | ... | 0 | 0 |
| 0 | 0 | ... | 1 | 0 | 1 | 0 | 0 | ... | X | 1 | X | 0 | 0 | 1 | 1 | 0 | 0 | 1 | 1 | ... | 0 | 0 |
| 0 | 0 | ... | 1 | 1 | 0 | 0 | 0 | ... | X | X | 0 | 1 | 0 | 1 | 0 | 1 | 0 | 1 | 0 | ... | 0 | 0 |
| 0 | 0 | ... | 1 | 1 | 0 | 0 | 0 | ... | X | X | 1 | 0 | 1 | 0 | 1 | 0 | 1 | 0 | 1 | ... | 0 | 0 |
| 0 | 0 | ... | 1 | 1 | 1 | 0 | 0 | ... | X | X | X | 1 | 1 | 1 | 1 | 1 | 1 | 1 | 1 | ... | 0 | 0 |
| ... | ... | ... | ... | ... | ... | ... | ... | ... | ... | ... | ... | ... | ... | ... | ... | ... | ... | ... | ... | ... | ... | ... |
| 1 | 1 | ... | 1 | 1 | 0 | 0 | 0 | ... | 0 | 0 | 0 | 1 | 0 | 1 | 1 | 1 | 1 | 1 | 1 | ... | 1 | 1 |
| 1 | 1 | ... | 1 | 1 | 0 | 0 | 0 | ... | 0 | 0 | 1 | 0 | 1 | 1 | 1 | 1 | 1 | 1 | 1 | ... | 1 | 1 |
| ... | ... | ... | ... | ... | ... | ... | ... | ... | ... | ... | ... | ... | ... | ... | ... | ... | ... | ... | ... | ... | ... | ... |

Notes:
1. X1 and L1 are LSBs
2. If all Xi are 0, the decoder behaves as a conventional decoder
3. $K = 2^N - 1$ Figure 3. Truth table for SAT decoder, n=3

Example: SAT Decoder Truth Table for n=3

| X3 | X2 | X1 | L3 | L2 | L1 | Y0 | Y1 | Y2 | Y3 | Y4 | Y5 | Y6 | Y7 |
|----|----|----|----|----|----|----|----|----|----|----|----|----|----|
| 0 | 0 | 0 | 0 | 0 | 0 | 1 | 0 | 0 | 0 | 0 | 0 | 0 | 0 |
| 0 | 0 | 0 | 0 | 0 | 1 | 0 | 1 | 0 | 0 | 0 | 0 | 0 | 0 |
| 0 | 0 | 0 | 0 | 1 | 0 | 0 | 0 | 1 | 0 | 0 | 0 | 0 | 0 |
| 0 | 0 | 0 | 0 | 1 | 1 | 0 | 0 | 0 | 1 | 0 | 0 | 0 | 0 |
| 0 | 0 | 0 | 1 | 0 | 0 | 0 | 0 | 0 | 0 | 1 | 0 | 0 | 0 |
| 0 | 0 | 0 | 1 | 0 | 1 | 0 | 0 | 0 | 0 | 0 | 1 | 0 | 0 |
| 0 | 0 | 0 | 1 | 1 | 0 | 0 | 0 | 0 | 0 | 0 | 0 | 1 | 0 |
| 0 | 0 | 0 | 1 | 1 | 1 | 0 | 0 | 0 | 0 | 0 | 0 | 0 | 1 |
| 0 | 0 | 1 | 0 | 0 | X | 1 | 1 | 0 | 0 | 0 | 0 | 0 | 0 |
| 0 | 0 | 1 | 0 | 1 | X | 0 | 0 | 1 | 1 | 0 | 0 | 0 | 0 |
| 0 | 0 | 1 | 1 | 0 | X | 0 | 0 | 0 | 0 | 1 | 1 | 0 | 0 |
| 0 | 0 | 1 | 1 | 1 | X | 0 | 0 | 0 | 0 | 0 | 0 | 1 | 1 |
| 0 | 1 | 0 | 0 | X | 0 | 1 | 0 | 1 | 0 | 0 | 0 | 0 | 0 |
| 0 | 1 | 0 | 0 | X | 1 | 0 | 1 | 0 | 1 | 0 | 0 | 0 | 0 |
| 0 | 1 | 0 | 1 | X | 0 | 0 | 0 | 0 | 0 | 1 | 0 | 1 | 0 |
| 0 | 1 | 0 | 1 | X | 1 | 0 | 0 | 0 | 0 | 0 | 1 | 0 | 1 |
| 0 | 1 | 1 | 0 | X | X | 1 | 1 | 1 | 1 | 0 | 0 | 0 | 0 |
| 0 | 1 | 1 | 1 | X | X | 0 | 0 | 0 | 0 | 1 | 1 | 1 | 1 |
| 1 | 0 | 0 | X | 0 | 0 | 1 | 0 | 0 | 0 | 1 | 0 | 0 | 0 |
| 1 | 0 | 0 | X | 0 | 1 | 0 | 1 | 0 | 0 | 0 | 1 | 0 | 0 |
| 1 | 0 | 0 | X | 1 | 0 | 0 | 0 | 1 | 0 | 0 | 0 | 1 | 0 |
| 1 | 0 | 0 | X | 1 | 1 | 0 | 0 | 0 | 1 | 0 | 0 | 0 | 1 |
| 1 | 0 | 1 | X | 0 | X | 1 | 1 | 0 | 0 | 1 | 1 | 0 | 0 |
| 1 | 0 | 1 | X | 1 | X | 0 | 0 | 1 | 1 | 0 | 0 | 0 | 1 |
| 1 | 1 | 0 | X | X | 0 | 1 | 0 | 1 | 0 | 1 | 0 | 1 | 0 |
| 1 | 1 | 0 | X | X | 1 | 0 | 1 | 0 | 1 | 0 | 1 | 0 | 1 |
| 1 | 1 | 1 | X | X | X | 1 | 1 | 1 | 1 | 1 | 1 | 1 | 1 |

Figure 4. Schematic diagram of the R-S Flip-Flop Array
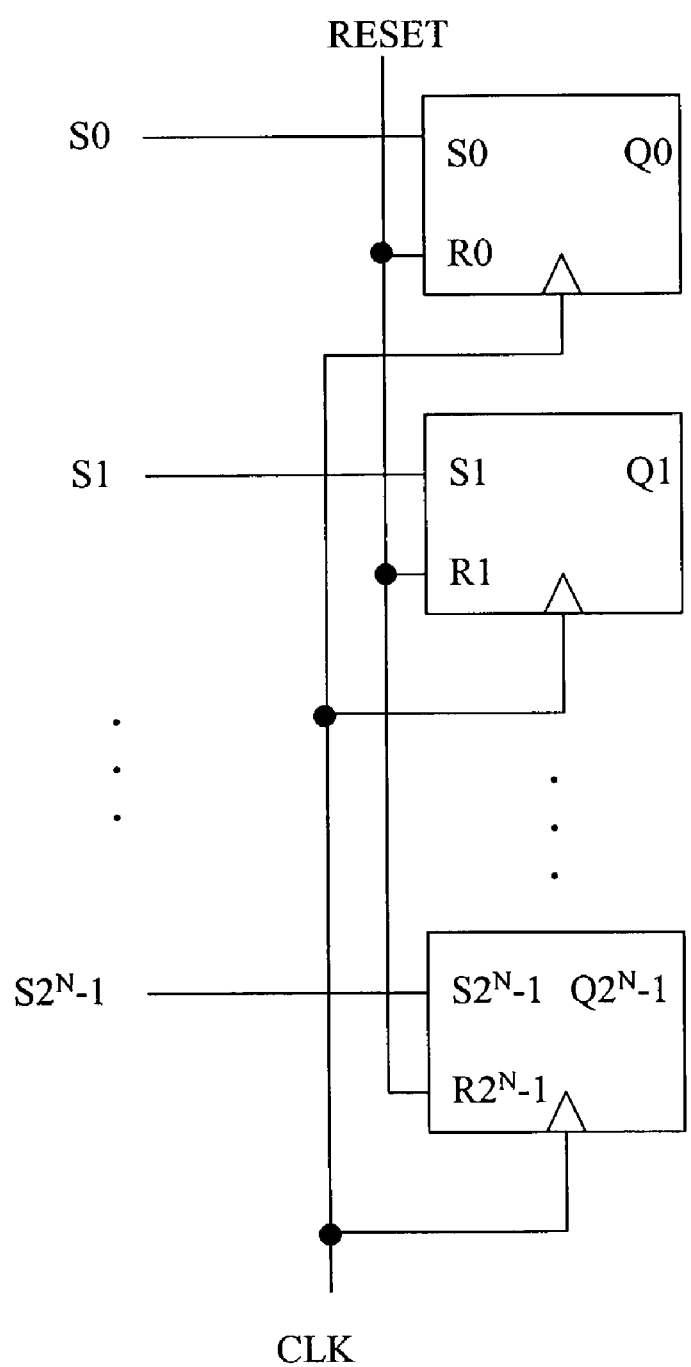

SEQUENTIAL MACHINE FOR SOLVING BOOLEAN SATISFIABILITY (SAT) PROBLEMS IN LINEAR TIME

1. TECHNICAL FIELD

The present invention relates in general to the field of computing, more specifically to a hardware-based method for solving the boolean satisfiability problem (SAT) in linear time, independent of the number of variables, for any n-variable instance of the problem, where the maximum value of n is set by hardware limitations.

2. BACKGROUND

The boolean satisfiability problem (or SAT) is a well-known problem, which belongs to the class of NP-complete problems [2]. SAT is stated as follows: given a boolean formula $F(x_1, x_2, \ldots x_n)$, find if there exists an assignment of binary values to each $(x_1, x_2, \ldots x_n)$, such that F equals 1. So far, no one has found a polynomial-time solution to SAT; finding one would imply that NP-complete problems can be solved in polynomial time, which has not been proved yet. While most attempts have been tried in software [3], in recent years, hardware solutions have been attempted for SAT [1,4,5,6]. However, such solutions are tailored for specific problem instances, instead of a general-purpose solution. Also, they don't have a guaranteed linear complexity as a function of only the number of clauses.

3. BRIEF SUMMARY

The invention is a general-purpose sequential machine for solving the SAT problem (GP-SAT). The machine can solve any n-variable instance of the SAT problem in O(m) time, where m is the number of clauses, independent of the number of variables, n, where the maximum value of n is set by hardware limitations. With current hardware technology, a value of n=32 variables can be achieved. The machine can serve as a basic building block to develop faster SAT solvers.

4. BRIEF DESCRIPTION OF THE DRAWINGS

FIG. 1. Schematic diagram of GP-SAT
FIG. 2. Truth table for SAT Decoder
FIG. 3. Truth table for SAT Decoder, n=3
FIG. 4. Schematic diagram of the R-S Flip-Flop Array

5. DETAILED DESCRIPTION

5.1. Restatement of SAT

An n-variable boolean formula $F(x_1, x_2, \ldots x_n)$ with m clauses, can be expressed in Conjunctive Normal Form (CNF) as a product of clauses, as follows:

$$F = \prod_{i=1}^{m} Ci$$

where Π represents the conjunction (AND) operation, and each Ci is a clause Each Ci can be defined as a function $Ci(x_1, x_2, \ldots x_n)$, and can be represented by a sum (OR) of variables, as follows:

$$Ci = \sum_{j=1}^{n} Lij$$

where each Lij is a literal, whose value is either $x_j$, $-x_j$, or 0. The value 0 indicates that the variable $x_j$ is not in the clause, in which case the term does not have any effect.

Since F is an AND, F is satisfiable if there exists an assignment that makes all Ci to evaluate to 1. Conversely, F is unsatisfiable if for all assignments, at least one Ci evaluates to 0.

We define the coverage set Vi of a clause Ci as the set of assignments for which Ci evaluates to 0. The coverage set V of F is defined as the union:

$$V = \bigcup_{i=1}^{m} V_i$$

V contains all the assignments for which at least one of the Ci will evaluate to 0. Clearly, if $|V|=2^n$, then F is unsatisfiable, since at least one Ci will evaluate to 0, for each possible assignment. Otherwise, F is satisfiable.

5.2. The GP-SAT Machine

So far, nobody has found a way of building in polinomial time the set V in a single-processor machine (otherwise, we can conclude that P=NP). However, combinatorial logic can be used to generate in parallel all elements of each Vi in V in a single clock cycle, as explained in this section.

A schematic diagram of the GP-SAT machine for n variables is presented in FIG. 1. The machine has 2n+2 inputs: two inputs (Lj and Xj) for each variable, a RESET input and a CLK (clock) input. Each Ci clause is input before the rising edge of the CLK input. For each Ci, the inputs Lj and Xj are set according to the following truth table:

TABLE 1

| Truth table for assignment of Xj and Lj | | |
|---|---|---|
| Condition for variable $x_j$ | Xj | Lj |
| Appears in the clause, non-negated | 0 | 0 |
| Appears in the clause, negated | 0 | 1 |
| Does not appear in the clause | 1 | X |

Formulas are processed in the machine as follows:
1. Set and unset RESET to clear R-S memory.
2. For each Ci in F:
   a. Input clause Ci' according to Table 1.
   b. Raise and lower CLK
3. Look at output SAT The SAT Decoder is a special decoder with 2n inputs and $2^n$ outputs. It is responsible for identifying the coverage set of each clause. Each output Ym corresponds to a variable assignment, where Y0 corresponds to an assignment of all 0s, and $Y_2^{k-1}$ corresponds to an assignment of all 1s. If all X in the input are 0, meaning that all variables are present in the clause, the decoder behaves as a normal decoder. Otherwise, for each absent variable in the clause, all outputs corresponding to elements of the coverage set are set to 1.

A truth table for the SAT Decoder is presented in FIG. 2. As an example, a truth table for a SAT decoder for n=3 is presented in FIG. 3.

Outputs from the decoder are fed into an R-S Flip-Flop Array. This array serves as a memory for building the coverage set. A schematic diagram of the array is presented in FIG. 4.

Finally, all outputs from the flip-flop array are fed into a NAND circuit, which gives the SAT output. When the coverage set reaches the maximum of $2^n$, all inputs of the NAND are set to 1, causing the output SAT to be 0.

What is claimed is:

1. An apparatus that solves, in linear time O(M), any SAT problem instance representing a boolean formula of N variables and M clauses, being the maximum value of N constrained by hardware limitations, and said apparatus comprising:
   a. A 2×N to $2^N$ SAT decoder unit, which, based on the value of 2×N inputs corresponding to a clause in a boolean formula F, sets each one of its $2^N$ outputs to represent the coverage set of the clause, defined as the set of distinct variable assigments of the formula F for which the input clause evaluates to 0, where each one of the $2^N$ outputs corresponds to one element in the coverage set, each one of such elements corresponding to a unique assignment of values to the N variables in the formula F.
   b. An R-S Flip Flop Array unit, consisting of $2^N$ flip-flops, each one corresponding to an output of the 2×N to $2^N$ SAT decoder unit. The R-S Flip-Flop Array unit serves as a memory for each output of the decoder unit, to remember whether such output has been previously set to 1. The unit has a RESET input, to clear or set to 0 the contents of each flip-flop, and a CLK input to set each flip-flop in the array to be equal to the value of its corresponding input.
   c. A negative-and (NAND) gate unit, whose inputs are the outputs of the R-S Flip Flop Array unit, and whose output will be set to 0 only if all its inputs are set to 1.

2. The machine of claim 1, wherein a boolean formula F of N variables $x_1, x_2, \ldots, x_N$, represented by a conjunction of M clauses $C_1, C_2, \ldots, C_M$, is processed by presenting each Ci at the 2×N inputs of the SAT decoder unit, each Ci being a disjunction of N literals $t_1+t_2+\ldots+t_N$, each $t_j$ literal being represented by two bits: (i) the $X_j$ bit, input to the $X_j$ input of the SAT decoder, to indicate the presence of the variable $x_j$ in the literal $t_j$ (0=present, 1=not present) and (ii) the $L_j$ bit, input to the $L_j$ input of the SAT decoder, to indicate whether the variable is negated or not (1=negated, 0=non-negated), if it is present in the literal.

3. The machine of claim 1, along with the representation of a boolean formula F as defined in claim 2, wherein the following process is used to solve SAT for the function F:
   a. Set and unset the RESET input to clear the output of all R-S flip flops in the Array, setting them to 0.
   b. For each clause Ci in F:
      i. Present the clause Ci at the L and X inputs of the SAT decoder.
      ii. Set CLK to 1
      iii. Set CLK to 0
   c. Look at output SAT, where SAT=1 means satisfiable, and SAT=0 means unsatisfiable.

4. The machine of claim 1, wherein the SAT decoder is tailored to compute, in a single clock cycle (i.e., setting CLK to 1 and then to 0), the set of assignments of the variables in formula F that will make each input clause Ci to evaluate to a binary 0 (or coverage set).

* * * * *